US012583470B2

(12) United States Patent
Heyl et al.

(10) Patent No.: US 12,583,470 B2
(45) Date of Patent: Mar. 24, 2026

(54) METHOD FOR PROCESSING SENSOR DATA IN A CONTROL DEVICE OF A VEHICLE

(71) Applicant: Robert Bosch GmbH, Stuttgart (DE)

(72) Inventors: Andreas Heyl, Weil der Stadt (DE);
Peter Schneider, Holzgerlingen (DE);
Stephan Reuter, Thalfingen (DE);
Theresa Kienle, Neugereut (DE);
Thomas Gussner, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 92 days.

(21) Appl. No.: 18/441,257

(22) Filed: Feb. 14, 2024

(65) Prior Publication Data

US 2024/0286627 A1     Aug. 29, 2024

(30) Foreign Application Priority Data

Feb. 21, 2023     (DE) ..................... 10 2023 201 522.6

(51) Int. Cl.
*B60W 50/06*     (2006.01)
*B60W 50/02*     (2012.01)
(52) U.S. Cl.
CPC ........ *B60W 50/06* (2013.01); *B60W 50/0205* (2013.01)
(58) Field of Classification Search
CPC .......................... B60W 50/06; B60W 50/0205

USPC ........................................................ 701/31.7
See application file for complete search history.

(56) References Cited

U.S. PATENT DOCUMENTS

| | | | |
|---|---|---|---|
| 10,676,071 B2 * | 6/2020 | Dusina ............... | G02B 27/0006 |
| 11,965,754 B2 * | 4/2024 | Shibayama .............. | G08G 1/00 |
| 2017/0213462 A1 * | 7/2017 | Prokhorov ............. | G08G 1/166 |
| 2021/0116256 A1 * | 4/2021 | Konrardy ............. | G06Q 50/265 |
| 2021/0125011 A1 * | 4/2021 | Lee ......................... | G01S 13/865 |

FOREIGN PATENT DOCUMENTS

| | | | | |
|---|---|---|---|---|
| KR | 20220041986 A | * | 4/2022 | ........... G01S 13/867 |

* cited by examiner

*Primary Examiner* — Isaac G Smith
(74) *Attorney, Agent, or Firm* — NORTON ROSE FULBRIGHT US LLP

(57)     ABSTRACT
A method for processing sensor data in a control device of a vehicle. The method includes: evaluating sensor data generated by different sensors of the vehicle for detecting its environment, via different evaluation functions which convert at least part of the sensor data as input data into output data, wherein the output data are assigned a priority using an assignment rule based on known insufficiencies of the sensors and/or the evaluation functions and the output data are used according to their priority in order to update an environment model that stores information about objects in the environment of the vehicle; recognizing an insufficiency that differs from the known insufficiencies using at least a part of the sensor data and/or at least a part of the output data; updating the assignment rule based on the recognized insufficiency.

13 Claims, 2 Drawing Sheets

METHOD FOR PROCESSING SENSOR DATA IN A CONTROL DEVICE OF A VEHICLE

FIELD

The present invention relates to a method for processing sensor data in a control device of a vehicle. Furthermore, the present invention relates to a control device, a computer program and a computer-readable medium for executing the method. The present invention also relates to a vehicle system equipped with such a control device.

BACKGROUND INFORMATION

The ISO/PAS 21448 standard (Road vehicles-Safety of the intended functionality) requires that the safety concept for environment perception in autonomous systems takes into account the capabilities and insufficiencies of the environment sensors used. Safety-critical sensor insufficiencies that should be avoided include incorrect measurements and false positive or false negative measurement results, which can lead to false assessments of the environment and, in the worst case, to accidents.

In order to avoid such false assessments due to unrecognized functional insufficiencies, a so-called expert system can be used, which can provide information about insufficiencies of sensors and/or perception functions. This information can then be used by a fusion system to evaluate the different contributions of the perception system (consisting of sensors and algorithms) to the environment model or a part thereof and to weight them according to their current reliability in the fusion algorithm.

Such an expert system is typically developed in a design phase for an entire fleet of vehicles. However, new insufficiencies can occur in the field depending on the vehicle, for example due to mechanical, thermal or electrical influences, which can lead to misalignment, damage to the optics or loss of performance, among other things. Manufacturing tolerances, accidental or systematic hardware or software errors or incorrect map data can also be the cause of new insufficiencies. The causes can occur permanently or temporarily. It is possible that some causes were not yet known or could not be anticipated during the design phase. These can be, for example, special weather conditions or a special combination of weather conditions with features of infrastructure such as special reflections on the road surface or special lane markings.

SUMMARY

Against this background, a method, a control device, a computer program, a computer-readable medium and a system according to the present are presented below. Advantageous developments and improvements of the present invention disclosed herein arise from the disclosure herein.

Example embodiments of the present invention make it possible to recognize previously unknown insufficiencies in the processing of environment sensor data in the vehicle that occur during vehicle operation, and to adjust the processing accordingly, for example using a special expert system that can thus provide corresponding information to the vehicle systems affected.

A first aspect of the present invention relates to a method for processing sensor data in a control device of a vehicle, wherein the vehicle comprises different sensors for detecting an environment of the vehicle and the sensor data have been generated by the sensors. According to an example embodiment of the present invention, the method comprises: evaluating the sensor data via different evaluation functions, which in each case are configured to convert at least a part of the sensor data as input data into output data, wherein the output data are assigned a priority using an assignment rule based on known insufficiencies of the sensors and/or the evaluation functions and the output data are used according to their priority in order to update an environment model that stores information about objects in the environment of the vehicle; recognizing an insufficiency that differs from the known insufficiencies using at least a part of the sensor data and/or at least a part of the output data; updating the assignment rule on the basis of the recognized insufficiency, so that the output data of at least one of the evaluation functions are assigned a different priority in the future than the priority currently assigned to them.

The method of the present invention makes it possible to diagnose insufficiencies (which can also include errors) in a perception system of a driver assistance system, such as that used for autonomous driving, during operation of the vehicle, i.e., while driving, and to provide corresponding information, for example using a so-called expert system.

Thus, previously unknown insufficiencies, such as those that can occur temporarily or permanently due to mechanical, thermal or electrical influences, manufacturing tolerances, random or systematic hardware or software errors, incorrect map data or unforeseen boundary conditions (for example, weather conditions or road conditions) during vehicle operation, can be taken into account in a suitable manner when processing the sensor data, for example by automatically carrying out a vehicle-specific calibration of the particular system. False measurements, false positive or false negative measurement results or false estimations of the environment can be significantly reduced using the method compared to conventional methods, in which the insufficiencies are to a certain extent predetermined. This can reduce the risk of accidents due to latent insufficiencies.

Not only insufficiencies of the sensors, but also insufficiencies of the evaluation functions (for example, of perception algorithms) or of map data or insufficiencies resulting from the interaction of boundary conditions and evaluation functions can be recognized during operation of the vehicle and compensated for accordingly.

In addition, the diagnosis and/or adaptive adjustment of information with respect to the insufficiencies (for example, in the form of error entries) is made possible over a longer period of time. Such information, in the form of a collection of evidence, carries greater significance than a simple binary error status (for example, "sensor defective").

One advantage of the method of the present invention is therefore the increase in safety through the recognition and management of vehicle-specific (latent) insufficiencies, which, if they remain unrecognized, can lead to gross inaccuracies and even accidents, either alone or in combination with other latent or known insufficiencies.

A further advantage of the method of the present invention is the possibility of improving a fleet-wide sensor expert system by collecting data from a plurality of vehicles regarding previously unknown, vehicle-specific insufficiencies.

It should be noted that, in general, the method of the present invention is suitable for use in all technical fields that require reliable perception of the environment, such as automated driving, advanced driver assistance systems ("ADAS"), mobile robotics, industrial robotics or railroad automation.

Certain features of the method are explained below.

The method can be computer-implemented and executed automatically by a processor, for example of the control device.

The term "vehicle" can be understood above and below to mean, for example, a car, a truck, a bus, a motorcycle or an autonomously moving robot.

The term "insufficiency" can be understood above and below to mean, for example, a measurement uncertainty, a measurement deviation, a measurement error, a false positive or false negative measurement result or a value based on at least one of these examples. "Insufficiency" can also be understood as a probability with respect to one or more of the aforementioned examples. The known insufficiencies can be empirical values or may have been determined experimentally before the control device was produced.

The evaluation functions can, for example, comprise at least one of the following functions:

Tracking of dynamic objects,

Generation of a two-dimensional or three-dimensional grid map with static and/or dynamic objects, Determination of a current detection range of the sensors, Determination of traffic rules (for example, via detected traffic signs or traffic lights), Localization of the vehicle and/or objects in its environment on a digital map (for example, using GraphSLAM).

The input data for a particular evaluation function can comprise one or more types of sensor data. The input data for different evaluation functions can at least partially match one another and/or at least partially differ from one another, for example in terms of data type.

The sensor data can be evaluated in an evaluation module (for example, a hardware and/or software module of a system for fusing the sensor data) with a plurality of inputs, wherein each input is linked to one of the evaluation functions. For example, such an evaluation module can have a separate input for each sensor data type and/or for each of the sensors. Such inputs can be weighted differently according to the priorities.

Information stored by the environment model can be, for example, positions and/or orientations and/or categories of objects. The influence of the particular output data on the environment model can be changed by updating the assignment rule. In this way, errors in the environment model due to latent insufficiencies can be avoided.

The assignment rule can be formed by a set of known rules. Additionally or alternatively, the assignment rule can comprise an algorithm trained by machine learning with hidden (and therefore unknown) rules, preferably in the form of an artificial neural network. The assignment rule can be a so-called expert system.

A second aspect of the present invention relates to a control device comprising a processor that is configured to execute the method of the present invention described above and below. The control device can comprise hardware and/or software modules. In addition to the processor, the control device can comprise a memory and data communication interfaces for wireless (for example, via WLAN, mobile radio, Bluetooth) and/or wired data communication with peripheral devices, for example with a server, a PC, a laptop, a tablet or a smartphone, but also with another vehicle or an infrastructure element (in each case as part of V2X communication).

It should be noted that features of the method of the present invention as described above and below can also be features of the control device of the present invention (and vice versa).

A third aspect of the present invention relates to a system for a vehicle. The system comprises different sensors for detecting the environment of the vehicle and the control device described above and below.

The sensors can comprise, for example, at least one of the following sensors: a camera, an infrared camera, a lidar sensor, a radar sensor, an ultrasonic sensor.

Further aspects of the present invention relate to a computer program and a computer-readable medium on which the computer program is stored.

The computer program comprises instructions that cause a processor to perform the method of the present invention described above and below when the computer program is executed by the processor.

The computer-readable medium can be a volatile or non-volatile data memory. For example, the computer-readable medium can be a hard disk, a USB memory device (universal serial bus), a RAM (random-access memory), a ROM (read-only memory), an EPROM (erasable programmable read-only memory), an EEPROM (electrically erasable programmable read-only memory), a flash memory or a combination of at least two of such examples. The computer-readable medium can also be a data communication network that enables program code to be downloaded (for example, via the Internet) or a cloud.

It should be noted that features of the method of the present invention as described above and below can also be features of the computer program and/or the computer-readable medium (and vice versa).

Embodiments of the present invention can be considered to be based on the ideas and findings described below. However, the present invention is not limited to these embodiments.

According to one example embodiment of the present invention, the recognition of the insufficiency can comprise a mutual comparison of the output data of different evaluation functions.

According to one example embodiment of the present invention, the recognition of the insufficiency can comprise a mutual comparison of the input data of different evaluation functions.

According to one example embodiment of the present invention, the recognition of the insufficiency can comprise a comparison of the output data of at least one of the evaluation functions with the particular input data.

Each of the aforementioned embodiments enables a comprehensive plausibility check of the particular data. Based on the particular plausibility, conclusions can then be drawn about certain latent insufficiencies.

What is possible in this connection is, for example, a mutual plausibility check of the sensors with respect to detected features and objects, a mutual plausibility check of fusion functions (for example, by comparing visibility determination, free space recognition and object recognition), a continuous evaluation with respect to systematic anomalies in the fusion (for example, frequent rejection of contributions from a sensor despite high confidence or overruling of a sensor by other sensors), a continuous evaluation with respect to systematic anomalies in a localization function (for example, repeated similar errors or excessive deviations in the detection of specific features), a continuous evaluation with respect to systematic anomalies when comparing map data and a visible region determined within the vehicle (for example, recognition of objects in regions that should not be visible according to map information, for example due to obstruction) or a combination of at least two of the aforementioned steps.

According to one example embodiment of the present invention, a data structure mapping at least part of the environment of the vehicle and deviating from the environment model can be stored in the control device. In this case, at least one of the evaluation functions can be configured to convert the input data into the output data using the data structure. This can improve the recognition of objects in the environment of the vehicle, for example their localization and/or categorization, using the relevant evaluation function.

According to an example embodiment of the present invention, additionally or alternatively, the insufficiency can further be recognized using the data structure. For example, the sensor and/or output data can be at least partially compared with the data structure for plausibility. This can further improve the accuracy of recognition.

According to an example embodiment of the present invention, additionally or alternatively, the recognized insufficiency can be an error in the data structure.

In general, according to an example embodiment of the present invention, the data structure can comprise data with respect to certain objects in the environment, for example road and/or traffic data, and a model linking the data according to certain (known and/or unknown) rules.

The data structure can also be used when updating the environment model, for example for more precise localization and/or categorization of the objects.

According to one example embodiment of the present invention, the data structure can be a digital map, a digital twin or a combination of a digital map and a digital twin. For example, the digital twin can be configured to realistically simulate the properties of a section of road that the vehicle is currently following.

Such a data structure can provide useful a priori information for the generation and/or evaluation of sensor data. This can be, for example, model-based information with respect to a precise road topology and/or condition or real-time information on the basis of an infrastructure sensor system, environment models of other vehicles and/or crowd-sourcing via a wide variety of road users.

According to one example embodiment of the present invention, the assignment rule can only be updated if the recognized insufficiency is relevant to safety (that is, relevant for the safe operation of the vehicle). This avoids unnecessary updates to the assignment rule.

According to one example embodiment of the present invention, the assignment rule can define different priorities for different boundary conditions, in particular different weather conditions and/or different road conditions, and assign their particular priority to the output data on the basis of current boundary conditions. The current boundary conditions may, for example, have been determined by evaluating at least part of the sensor data and/or by evaluating further sensor data generated by at least one further sensor of the vehicle (for example, a rain sensor) and/or by evaluating weather data and/or information from the infrastructure (hereinafter also referred to as communication data). This enables highly accurate and reliable recognition of objects in the environment of the vehicle, even under highly fluctuating boundary conditions.

According to one example embodiment of the present invention, the assignment rule can assign a higher priority to the output data, the lower the insufficiencies assigned to the output data. The expression "insufficiencies assigned to the output data" primarily refers to the insufficiencies of the sensors and/or evaluation functions required to generate the particular output data. However, this can also be due to errors in the aforementioned data structure, which are linked to the output data in some way. Output data whose priority is too low can be disregarded when updating the environment model or taken into account to a lesser extent than other output data with a higher priority.

According to one example embodiment of the present invention, a region of the environment of the vehicle that can be detected by the sensors can be mapped using a two-dimensional or three-dimensional grid. Each (known or recognized) insufficiency can be assigned to at least one grid element of the grid. The grid (also referred to above and below as a grid map) can consist of a large number of grid elements of the same size, which differ in their position in relation to the vehicle, for example more than 100, more than 1000, more than 10000 or even more than 100000 grid elements. The assignment rule can then assign the particular priority to the output data depending on which grid elements the insufficiencies assigned to the output data (see above) are assigned to. As a rule, the accuracy with which a sensor can detect an object depends on the position and/or orientation of the object in relation to the sensor, in addition to other boundary conditions (such as weather or reflection conditions). For example, some sensors are less able to detect objects that are further away than objects that are closer (or vice versa). Partially obstructed objects are also normally detected less well than non-obstructed objects. Such dependencies of the particular insufficiencies of a sensor and the evaluation function (s) associated therewith can be taken into account accordingly when determining the priorities. This can further improve the accuracy of the method.

According to one example embodiment of the present invention, the method can further comprise a step in which a message with respect to the recognized insufficiency is transmitted to a data processing device located outside the vehicle, preferably via a wireless data communication link (for example, via WLAN, mobile radio, Bluetooth). As mentioned above, such a data processing device can be, for example, a server, a PC, a laptop, a tablet or a smartphone, but also a control device of another vehicle or an infrastructure element, such as a traffic light. This enables (further) processing of information with respect to the recognized insufficiency(ies) independently of the current location of the vehicle.

According to one example embodiment of the present invention, communication data can be received in the control device via a wireless data communication link, which connects the vehicle to at least one further vehicle and/or at least one infrastructure element (located outside the vehicle) for data communication (for example, as part of V2X communication). In this case, the input data for at least one of the evaluation functions can also comprise at least a part of the communication data. This can further improve the evaluation of sensor data.

BRIEF DESCRIPTION OF THE DRAWINGS

In the following, embodiments of the present invention are described with reference to the figures. However, the present invention is neither limited to the figures nor to the following description.

The drawings are purely schematic and not to scale. If the same reference signs are used in different figures, such reference signs denote the same features or features that have the same effect.

DETAILED DESCRIPTION OF EXAMPLE EMBODIMENTS

Figure 1:
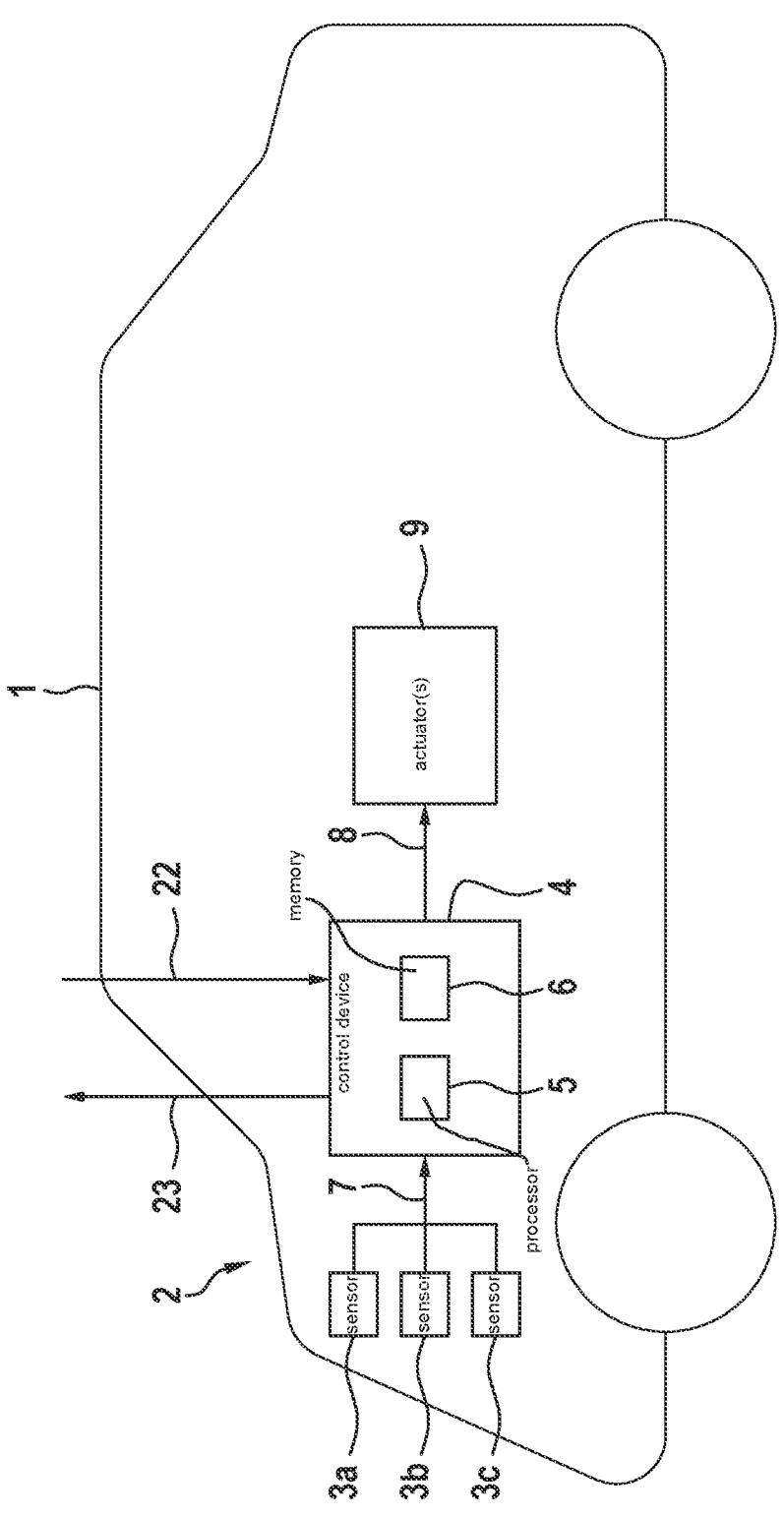
FIG. 1 shows a vehicle with a system according to one example embodiment of the present invention.

FIG. 1 shows a vehicle 1 with a system 2 which comprises different sensors, here a camera 3a, a radar sensor 3b and a lidar sensor 3c, for detecting an environment of the vehicle 1, as well as a control device 4 with a processor 5 and a memory 6.

The control device 4 is configured to evaluate sensor data 7 generated by the sensors 3a, 3b, 3c when detecting the environment and, depending on the results of this evaluation, to generate control commands 8 for controlling at least one actuator 9, such as a steering or braking actuator or an electric drive motor of the vehicle 1, so that the vehicle 1 drives autonomously or partially assists its driver.

The processor 5 is configured to execute a special method for processing the sensor data 7 by executing a computer program stored in the memory 6.

Figure 2:
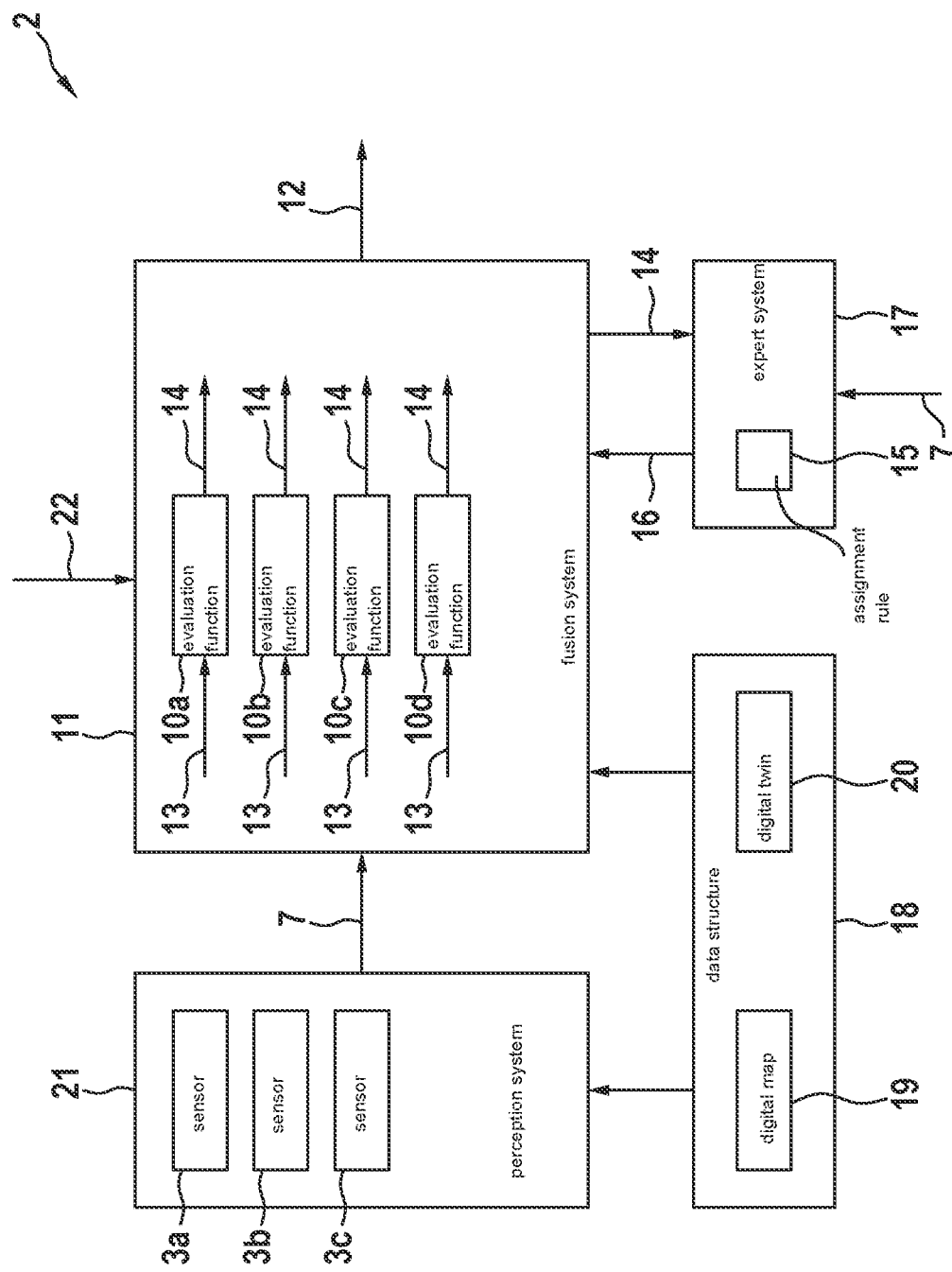
FIG. 2 shows modules of a system according to one example embodiment of the present invention.

For this purpose, the sensor data 7, as illustrated in FIG. 2, are evaluated via different evaluation functions 10a to 10d of a fusion system 11 for fusing the sensor data 7 in an environment model 12 which stores information about objects in the environment of the vehicle 1. Here, the evaluation functions 10a to 10d comprise a first evaluation function 10a for tracking objects ("object tracking"), a second evaluation function 10b for generating a preferably three-dimensional grid map allocated to the environment, a third evaluation function 10c for recognizing current detection ranges of the sensors 3a, 3b, 3c and a fourth evaluation function 10d for localizing the vehicle 1 and/or objects in its environment. Each evaluation function 10a to 10d is configured to convert at least a part of the sensor data 7 as input data 13 into corresponding output data 14, which is then used to update the environment model 12.

Each evaluation function 10a to 10d is assigned a priority 16 using an assignment rule 15 that is based on known insufficiencies of the sensors 3a, 3b, 3c and/or the evaluation functions 10a to 10d, for example by a (sensor) expert system 17 running on the control device 4. The output data 14 are then used to update the environment model 12 according to the priorities 16.

It is advantageous if the assignment rule 15 defines different priorities 16 for different environmental conditions that can influence the function of the sensors 3a, 3b, 3c, such as weather conditions or road conditions. In this case, the assignment rule 15 assigns the particular priority 16 to the output data 14 on the basis of current environmental conditions that can be detected by sensors. This makes it possible, for example, to assign a lower priority 16 to output data 14 that are attributable to a sensor that is performing worse than normal under the current environmental conditions. In this way, gross inaccuracies in the environment model 12 due to changing environmental conditions can be avoided.

In addition, the sensor data 7 (or a part thereof) and/or the resulting output data 14 (or a part thereof) are evaluated in order to recognize new insufficiencies in addition to the known insufficiencies. This additional evaluation can, as here, be carried out by the expert system 17 or by another hardware and/or software module of the control device 4.

For this purpose, the output data 14 of at least two of the evaluation functions 10a to 10d can be compared with each other. Additionally or alternatively, the input data 13 of at least two of the evaluation functions 10a to 10d can be compared with each other. As a further option, the output data 14 can be compared with the corresponding input data 13. These steps serve to check the plausibility of the particular data and enable conclusions to be drawn about any latent insufficiencies of the sensors 3a, 3b, 3c, the evaluation functions 10a to 10d or other hardware and/or software components that are relevant for the fusion of the sensor data 7 and thus for the generation of a correct environment model 12.

The assignment rule 15 is then updated in a suitable manner depending on which new insufficiencies have been recognized, so that the output data 14 of at least one of the evaluation functions 10a to 10d are assigned a different priority 16 in a future evaluation step than the priority 16 currently assigned to them. In this way, potentially safety-critical inaccuracies in the evaluation of the sensor data 7, such as those caused by unrecognized (safety-relevant) insufficiencies, can be avoided.

Expediently, the assignment rule 15 generally assigns a higher priority 16 to the output data 14 of each evaluation function 10a to 10d, the lower the related insufficiencies are.

A recognized insufficiency can relate to one of the sensors 3a, 3b, 3c, one of the evaluation functions 10a to 10d or to certain a priori information from a data structure 18 that deviates from the environment model 12. The data structure 18 can be stored in the memory 6 in addition to the environment model 12. In this example, the data structure 18 comprises a high-resolution digital map 19 of the environment and a digital twin 20 of a road topology and condition in the environment.

The a priori information can be used by the fusion system 11 to evaluate the sensor data 7 more accurately, i.e., to provide better output data 14 and thus a more accurate and reliable environment model 12. In addition, the a priori information can be used to recognize new insufficiencies, here by the expert system 17. In addition, the a priori information can be used by a perception system 21 comprising the sensors 3a, 3b, 3c, for example to provide suitable sensor data 7 (or the sensor data 7 in a form suitable for processing in the fusion system 11).

The control device 4 can be configured to receive communication data 22 wirelessly from other vehicles and/or correspondingly equipped infrastructure elements, such as traffic lights or traffic signs, and provide it to the fusion system 11, so that at least a part of the communication data 22 can be input to one or more of the evaluation functions 10a to 10d as part of the input data 13. The communication data 22 can, among other things, encode information about objects or traffic rules present in the environment of the vehicle 1. This can further improve the accuracy of the evaluation.

In addition, the control device 4 can be configured to transmit messages 23 containing information with respect to the new insufficiencies to one or more data processing devices external to the vehicle. This enables further diagnosis of the new insufficiencies regardless of the location of the vehicle 1.

Preferably, the method comprises the detection of errors and (previously unknown) insufficiencies through extensive mutual plausibility checks of the perception modules (for example, video, lidar, radar), the fusion modules (for example, object tracking, localization) and the a priori information (for example, HD map data, information stored in the expert system with respect to the particular properties of the sensors), the evaluation of these errors and insufficiencies and the provision of corresponding information via the expert system.

At least one of the following steps can be carried out in response to the recognition of a new insufficiency:

Recalibration of the expert system, for example by adjusting capability classes or the weighting of stored information with respect to the particular properties of the sensors;

Entry of corresponding error information into the expert system;

Initiation of a targeted diagnosis of the information affected by the recognized insufficiency in the expert system;

Initiation of a targeted check of the correctness and/or up-to-date status of map data.

The sensor information stored in the expert system can, for example, be stored separately for each grid element of the aforementioned grid map and for each sensor (or each sensor modality), for example in a matrix. The particular sensor properties can be entered into the matrix under different boundary conditions, wherein each column (or row) of the matrix corresponds to a particular boundary condition.

Finally, it should be noted that terms such as "have," "comprise," "include," "with" etc. do not exclude other elements or steps and indefinite articles such as "a" or "an" do not exclude a plurality. It is further noted that features or steps described with reference to any of the above-described embodiments can also be used in combination with features or steps described with reference to the other above-described embodiments. Reference signs are not to be understood as limiting the scope of the present invention.

The invention claimed is:

1. A method for processing sensor data in a control device of a vehicle, wherein the vehicle includes different sensors configured to detect an environment of the vehicle and generate the sensor data, wherein the method comprises the following steps:

evaluating, by the control device, the sensor data via different evaluation functions, each of the different evaluation functions being configured to convert at least part of the sensor data as input data into output data, wherein the output data of each of the different evaluation functions are assigned a respective priority using an assignment rule based on known insufficiencies of the sensors and/or the evaluation functions and the output data are used according to their priority to update an environment model that stores information about objects in the environment of the vehicle;

recognizing, by the control device, an insufficiency that differs from the known insufficiencies using at least a part of the sensor data and/or at least a part of the output data;

updating, by the control device, the assignment rule based on the recognized insufficiency, so that the output data of at least one of the evaluation functions are assigned a different priority in the future than the priority currently assigned to the output data; and controlling, by the control device, the vehicle using the updated assignment rule, wherein a data structure mapping at least part of the environment of the vehicle and deviating from the environment model is stored in the control device, and wherein at least one of the evaluation functions is configured to convert the input data into the output data using the data structure.

2. The method according to claim 1, wherein the recognition of the insufficiency includes:

a mutual comparison of the output data of different ones of the evaluation functions; and/or a mutual comparison of the input data of different ones of the evaluation functions; and/or a comparison of the output data respective input data.

3. The method according to claim 1, wherein:

the insufficiency is further recognized using the data structure, and/or the recognized insufficiency is an error in the data structure.

4. The method according to claim 3, wherein the data structure is: (i) a digital map, or (ii) a digital twin, or (iii) a combination of a digital map and a digital twin.

5. The method according to claim 1, wherein the assignment rule is updated only when the recognized insufficiency is relevant to safety.

6. The method according to claim 1, wherein the assignment rule defines different priorities or different boundary conditions including: (i) different weather conditions and/or (ii) different road conditions, and wherein the assignment rule assigns the respective priority to the output data based on current boundary conditions.

7. The method according to claim 1, wherein the assignment rule assigns a higher priority to the output data, the lower the insufficiencies assigned to the output data.

8. The method according to claim 1, wherein:

a region of the environment of the vehicle detected by the sensors is mapped by a two-dimensional or three-dimensional grid and each insufficiency is assigned to at least one grid element of the grid; and the assignment rule assigns the respective priority to the output data depending on which grid elements the insufficiencies assigned to the output data are assigned to.

9. The method according to claim 1, further comprising:

transmitting a message with respect to the recognized insufficiency to a data processing device located outside the vehicle.

10. The method according to claim 1, wherein communication data are received in the control device via: (i) a wireless data communication link which connects the vehicle to at least one further vehicle and/or (ii) at least one infrastructure element for data communication, and the input data for at least one of the evaluation functions further include at least a part of the communication data.

11. A control device of a vehicle, comprising:

a processor coprocessing sensor data in the control device of the vehicle, wherein the vehicle includes different sensors configured to detect an environment of the vehicle and generate the sensor data, wherein the processor is configured to:

evaluate the sensor data via different evaluation functions, each of the different evaluation functions being configured to convert at least part of the sensor data as input data into output data, wherein the output data of each of the different evaluation functions are assigned a respective priority using an assignment rule based on known insufficiencies of the sensors and/or the evaluation functions and the output data are used according to their priority to update an environment model that stores information about objects in the environment of the vehicle;

recognize an insufficiency that differs from the known insufficiencies using at least a part of the sensor data and/or at least a part of the output data;

update the assignment rule based on the recognized insufficiency, so that the output data of at least one of the evaluation functions are assigned a different priority in the future than the priority currently assigned to the output data; and control the vehicle using the updated assignment rule, wherein a data structure mapping at least part of the environment of the vehicle and deviating from the environment model is stored in the control device, and wherein at least one of the evaluation functions is configured to convert the input data into the output data using the data structure.

12. A system for a vehicle, wherein the system comprises:

different sensors configured to detect an environment of the vehicle; and a control device including a processor coprocessing sensor data in the control device, wherein the vehicle includes the different sensors configured to detect the environment of the vehicle and generate the sensor data, wherein the control device is configured to:

evaluate the sensor data via different evaluation functions, each of the different evaluation functions being configured to convert at least part of the sensor data as input data into output data, wherein the output data of each of the different evaluation functions are assigned a respective priority using an assignment rule based on known insufficiencies of the sensors and/or the evaluation functions and the output data are used according to their priority to update an environment model that stores information about objects in the environment of the vehicle;

recognize an insufficiency that differs from the known insufficiencies using at least a part of the sensor data and/or at least a part of the output data;

update the assignment rule based on the recognized insufficiency, so that the output data of at least one of the evaluation functions are assigned a different priority in the future than the priority currently assigned to the output data; and control the vehicle using the updated assignment rule,

wherein a data structure mapping at least part of the environment of the vehicle and deviating from the environment model is stored in the control device, and wherein at least one of the evaluation functions is configured to convert the input data into the output data using the data structure.

13. A non-transitory computer-readable medium on which is stored a computer program for processing sensor data in a control device of a vehicle, wherein the vehicle includes different sensors configured to detect an environment of the vehicle and generate the sensor data, wherein the computer program, when executed by a processor, causes the processor to perform the following:

evaluating the sensor data via different evaluation functions, each of the different evaluation functions being configured to convert at least part of the sensor data as input data into output data, wherein the output data of each of the different evaluation functions are assigned a respective priority using an assignment rule based on known insufficiencies of the sensors and/or the evaluation functions and the output data are used according to their priority to update an environment model that stores information about objects in the environment of the vehicle;

recognizing an insufficiency that differs from the known insufficiencies using at least a part of the sensor data and/or at least a part of the output data;

updating the assignment rule based on the recognized insufficiency, so that the output data of at least one of the evaluation functions are assigned a different priority in the future than the priority currently assigned to the output data; and controlling the vehicle using the updated assignment rule, wherein a data structure mapping at least part of the environment of the vehicle and deviating from the environment model is stored in the control device, and wherein at least one of the evaluation functions is configured to convert the input data into the output data using the data structure.

* * * * *